United States Patent
Kawai et al.

(10) Patent No.: US 8,612,044 B2
(45) Date of Patent: Dec. 17, 2013

(54) CONTROL DEVICE FOR DIE-SINKING ELECTRICAL DISCHARGE MACHINE

(75) Inventors: Yasuhiro Kawai, Chiyoda-ku (JP); Shingo Chida, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 140 days.

(21) Appl. No.: 13/263,046

(22) PCT Filed: Apr. 7, 2009

(86) PCT No.: PCT/JP2009/001619
§ 371 (c)(1),
(2), (4) Date: Oct. 5, 2011

(87) PCT Pub. No.: WO2010/116413
PCT Pub. Date: Oct. 14, 2010

(65) Prior Publication Data
US 2012/0036511 A1    Feb. 9, 2012

(51) Int. Cl.
*G06F 19/00* (2011.01)

(52) U.S. Cl.
USPC ............. 700/115; 216/54; 425/461; 718/102

(58) Field of Classification Search
USPC ............. 700/115; 216/54; 425/461; 718/102
See application file for complete search history.

(56) References Cited

U.S. PATENT DOCUMENTS

| | | | | |
|---|---|---|---|---|
| 5,854,459 A | * | 12/1998 | Buhler et al. | 219/69.12 |
| 5,984,506 A | * | 11/1999 | Robbiani et al. | 700/162 |
| 6,150,627 A | * | 11/2000 | Sugiyama | 219/69.16 |
| 2003/0198714 A1 | * | 10/2003 | Cadiente et al. | 426/106 |
| 2005/0258136 A1 | * | 11/2005 | Kawanishi et al. | 216/54 |
| 2006/0081040 A1 | * | 4/2006 | Yamamoto | 73/105 |
| 2006/0179796 A1 | * | 8/2006 | Kadota et al. | 53/461 |
| 2009/0081325 A1 | * | 3/2009 | Kitamura et al. | 425/461 |

FOREIGN PATENT DOCUMENTS

| | | |
|---|---|---|
| JP | 06-019518 A | 1/1994 |
| JP | 06-055361 A | 3/1994 |
| JP | 06-149336 A | 5/1994 |
| JP | 10-296546 A | 11/1998 |

OTHER PUBLICATIONS

Office Action issued on Apr. 1, 2013 in Chinese Application No. 2009801585804.

* cited by examiner

*Primary Examiner* — Mohammad Ali
*Assistant Examiner* — Anthony Whittington
(74) *Attorney, Agent, or Firm* — Sughrue Mion, PLLC

(57) ABSTRACT

A program analyzing unit that extracts electrode numbers included in a plurality of processing programs, determines duplication of the electrode numbers among the processing programs to display a result of determination, and that stores correspondence between a revision electrode number that is specified by a user and an in-use electrode number that is used in the processing program for each of the processing programs and a program executing unit that executes each of the processing programs by reading the revision electrode number instead of the in-use electrode number used in each of the processing programs based on the stored correspondence at the time of execution of the processing programs are included, and duplication of the electrode numbers used among the programs is easily and certainly resolved.

2 Claims, 11 Drawing Sheets

FIG.4

| PROGRAM NUMBER | IN-USE ELECTRODE NUMBER | REVISION ELECTRODE NUMBER |
|---|---|---|
| L1 | 11 | 11 |
| | 12 | 12 |
| | 13 | 13 |
| L2 | 11 | 14 |
| | 12 | 15 |
| | 13 | 16 |
| L3 | 11 | 17 |
| | 12 | 18 |
| | 13 | 19 |
| | 14 | 20 |

FIG.5

ANALYSIS RESULT

L1

T-NUMBER MAP

| IN-USE T-NUMBER | ANALYSIS RESULT | REVISION NUMBER |
|---|---|---|
| 11 | × | |
| 12 | × | |
| 13 | × | |

MAGAZINE MAP

| T-NUMBER | DUPLICATION DESTINATION L-NUMBER |
|---|---|
| 11 | L1, 2, 3 |
| 12 | L1, 2, 3 |
| 13 | L1, 2, 3 |
| 14 | L3 |

L2

T-NUMBER MAP

| IN-USE T-NUMBER | ANALYSIS RESULT | REVISION NUMBER |
|---|---|---|
| 11 | × | |
| 12 | × | |
| 13 | × | |

MAGAZINE MAP

| T-NUMBER | DUPLICATION DESTINATION L-NUMBER |
|---|---|
| 11 | L1, 2, 3 |
| 12 | L1, 2, 3 |
| 13 | L1, 2, 3 |
| 14 | L3 |

L3

T-NUMBER MAP

| IN-USE T-NUMBER | ANALYSIS RESULT | REVISION NUMBER |
|---|---|---|
| 11 | × | |
| 12 | × | |
| 13 | × | |
| 14 | ○ | |

MAGAZINE MAP

| T-NUMBER | DUPLICATION DESTINATION L-NUMBER |
|---|---|
| 11 | L1, 2, 3 |
| 12 | L1, 2, 3 |
| 13 | L1, 2, 3 |
| 14 | L3 |

FIG.10

ANALYSIS RESULT (a)

| L-NUMBER \ T-NUMBER | 11 | 12 | 13 | 14 | 15 | 16 | 17 | 18 | 19 | 20 |
|---|---|---|---|---|---|---|---|---|---|---|
| 1 | ▨ | ▨ | ▨ | | | | | | | |
| 2 | ▨ | ▨ | ▨ | | | | | | | |
| 3 | ▨ | ▨ | ▨ | ▨ | | | | | | |

REVISION INPUT (b)

| L-NUMBER \ T-NUMBER | 11 | 12 | 13 | 14 | 15 | 16 | 17 | 18 | 19 | 20 |
|---|---|---|---|---|---|---|---|---|---|---|
| 1 | ▨ | ▨ | ▨ | | | | | | | |
| 2 | 14 | 15 | 16 | | | | | | | |
| 3 | 17 | 18 | 19 | 20 | | | | | | |

RE-DISPLAY AFTER INPUT (c)

| L-NUMBER \ T-NUMBER | 11 | 12 | 13 | 14 | 15 | 16 | 17 | 18 | 19 | 20 |
|---|---|---|---|---|---|---|---|---|---|---|
| 1 | ▨ | ▨ | ▨ | | | | | | | |
| 2 | | | | ▨ | ▨ | ▨ | | | | |
| 3 | | | | | | | ▨ | ▨ | ▨ | ▨ |

T-NUMBER MAP

| IN-USE T-NUMBER | ANALYSIS RESULT | REVISION NUMBER |
|---|---|---|
| 11 | ○ | |
| 12 | ○ | |
| 13 | ○ | |

MAGAZINE MAP (T)

| T-NUMBER | DUPLICATION DESTINATION L-NUMBER |
|---|---|
| 11 | L1 |
| 12 | L1 |
| 13 | L1 |
| 14 | L2 |
| 15 | L2 |
| 16 | L2 |
| 17 | L3 |
| 18 | L3 |
| 19 | L3 |
| 20 | L3 |

P-NUMBER MAP

| IN-USE P-NUMBER | ANALYSIS RESULT | REVISION NUMBER |
|---|---|---|
| 1 | × | |

MAGAZINE MAP (P)

| P-NUMBER | DUPLICATION DESTINATION L-NUMBER |
|---|---|
| 1 | L1, 2, 3 |

T-NUMBER MAP

| IN-USE T-NUMBER | ANALYSIS RESULT | REVISION NUMBER |
|---|---|---|
| 11 | ○ | |
| 12 | ○ | |
| 13 | ○ | |

MAGAZINE MAP (T)

| T-NUMBER | DUPLICATION DESTINATION L-NUMBER |
|---|---|
| 11 | L1 |
| 12 | L1 |
| 13 | L1 |
| 14 | L2 |
| 15 | L2 |
| 16 | L2 |
| 17 | L3 |
| 18 | L3 |
| 19 | L3 |
| 20 | L3 |

P-NUMBER MAP

| IN-USE P-NUMBER | ANALYSIS RESULT | REVISION NUMBER |
|---|---|---|
| 1 | ○ | |

MAGAZINE MAP (P)

| P-NUMBER | DUPLICATION DESTINATION L-NUMBER |
|---|---|
| 1 | L1 |
| 2 | L2 |
| 3 | L3 |

CONTROL DEVICE FOR DIE-SINKING ELECTRICAL DISCHARGE MACHINE

CROSS REFERENCE TO RELATED APPLICATION

This application is a National Stage of International Application No. PCT/JP2009/001619 filed Apr. 7, 2009, the contents of all of which are incorporated herein by reference in their entirety.

FIELD

The present invention relates to a control device for a die-sinking electrical discharge machine.

BACKGROUND

In a schedule function with which processing programs of a die-sinking electrical discharge machine are successively executed, when an electrode number to be used therein is duplicated, in a conventional method, it is necessary for a user to recognize electrode numbers of all programs, and to correct the processing programs themselves so that the numbers are not duplicated in advance, to be registered.

Therefore, the conventional method requires a lot of work and incurs mistakes, and the operability is considerably poor. Moreover, when an existing processing program is used, it is required for a user to revise only electrode numbers of the existing processing program, and to give a different processing program number to the processing program for which the electrode numbers are revised, to register in a system. Thus, the operability is considerably poor.

In a technique described in Patent Literature 1, specification of an electrode in a processing program is performed by setting a temporary number, and when a tool specification is issued during the execution of the processing program, an execution tool number is inquired at a scheduler that stores a correspondence table of temporary numbers and actual numbers, to load an actual number electrode.

CITATION LIST

Patent Literature

Patent Literature 1: Japanese Patent Application Laid-open No. H6-055361

SUMMARY

Technical Problem

In the technique described in Patent Literature 1, because the program is described using electrode temporary numbers, existing programs cannot be used and a dedicated processing program is required to be created. Moreover, because temporary numbers are used, the correspondence table of temporary numbers and actual numbers is certainly required to be created. Thus, a lot of work is required and mistakes can be made. Furthermore, temporary numbers used in the processing program and temporary numbers registered in the correspondence table are not communicated, and it is not guaranteed that temporary numbers used in the processing program are all registered in the correspondence table. Moreover, if a CAD/CAM is used, it is necessary to use a CAD/CAM that includes such a special processing that outputs a temporary number, which is not common.

The present invention is achieved in view of the above problems, and it is an object of the present invention to provide a highly versatile die-sinking electrical discharge machine that can resolve duplication of electrode numbers or pallet numbers used among programs certainly and easily.

Solution to Problem

To solve the above described problems and achieve the object, according to the present invention a control device of a die-sinking electrical discharge machine that performs electrical discharge machining by a die-sinking electrical discharge machine by successively executing a plurality of processing programs that have commands including electrode numbers includes: a program analyzing unit that extracts the electrode numbers included in the processing programs, determines duplication of the electrode numbers among the processing programs to display a result of determination, and that stores correspondence between a revision electrode number that is specified by a user and an in-use electrode number that is used in the processing program for each of the processing programs; and a program executing unit that executes each of the processing programs by reading the revision electrode number instead of the in-use electrode number used in each of the processing programs based on the stored correspondence at the time of execution of the processing programs.

Advantageous Effects of Invention

According to the present invention, electrode numbers used in each of programs are extracted, a duplication condition of the extracted electrode numbers is determined, a result of the determination is presented to a user, a correspondence between revision electrode numbers that are revised by the user and in-use electrode numbers that are used in the processing programs are stored for each of the processing programs, and the revision electrode numbers are read instead of the in-use electrode numbers used in each of the processing programs based on the stored content, to execute each of the processing programs. Therefore, it is possible to provide a highly versatile control device for a die-sinking electrical discharge machine that can resolve duplication of an electrode number used among programs certainly and easily.

BRIEF DESCRIPTION OF DRAWINGS

FIG. 4 is a view depicting an example of a storage content of a T-number correspondence table.

FIG. 5 is a view depicting a T-number map of each of the processing programs displayed on a display screen.

FIG. 10 is a view depicting another T-number map.

FIG. 11 is a view depicting a display example of a T-number/P-number map before revision, used in a second embodiment.

FIG. 12 is a view depicting a display example of the T-number/P-number map after revision, used in the second embodiment.

DESCRIPTION OF EMBODIMENTS

Embodiments of a control device of a die-sinking electrical discharge machine according to the present invention are explained in detail below with reference to the drawings. The present invention is not limited by these embodiments.

First Embodiment

Figure 1:
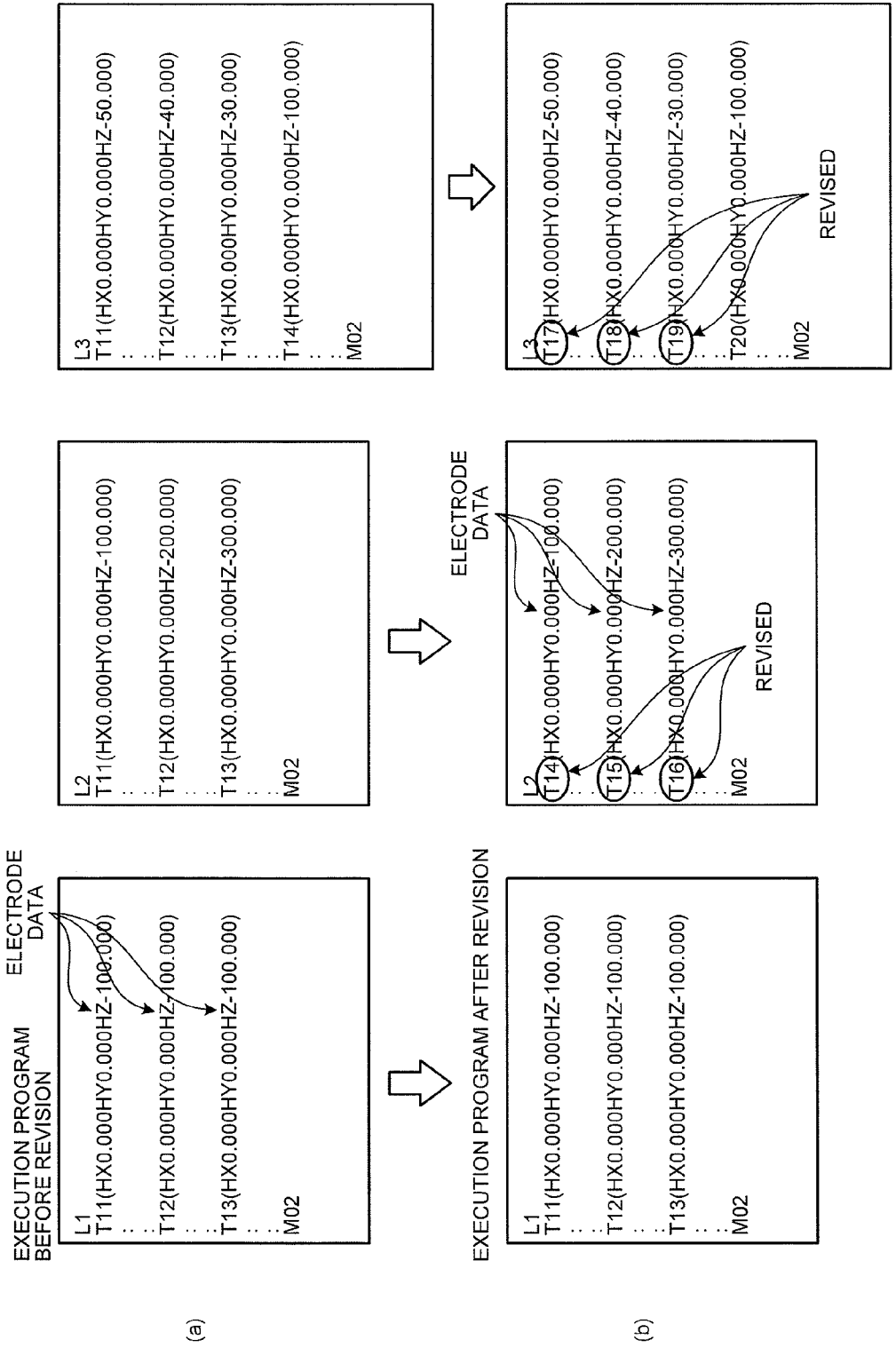
FIG. 1 is a view depicting processing programs before and after revision.

FIG. 1(a) illustrates an example of a processing program that is used for processing by a die-sinking electrical discharge machine, and in this case, three processing programs that are executed successively are illustrated. A processing program L1 that is executed first has tool commands T11, T12, and T13 including three different electrode numbers "11", "12", and "13", and performs machining of a workpiece using the three electrodes. A processing program L2 that is executed second has tool commands T11, T12, and T13 including three different electrode numbers "11", "12", and "13", and performs machining of a workpiece using the three electrodes. A processing program L3 that is executed third has tool commands T11, T12, T13, and T14 including four different electrode numbers "11", "12", "13", and "14", and performs machining of a workpiece using the four electrodes thereby. In the tool commands T11, T12, T13, and T14 of the respective programs, misalignment amounts information (offset information) defined by XYZ positions, in this case, are described as electrode data.

In a case illustrated in FIG. 1(a), duplicated electrode numbers "11", "12", and "13" are used among the three processing programs L1 to L3. In such a case, in the conventional technique, it is necessary for a user of the die-sinking electrical discharge machine to recognize electrode numbers of all of the programs and manually correct the processing programs themselves previously to register in the system, as illustrated in FIG. 1(b), so that the electrode numbers are not duplicated. In addition, the electrode data is required to be copied as it is from the one before revision of the processing programs. Accordingly, in the conventional technique, a lot of work is required and mistakes can be made, and the operability is considerably poor. Moreover, when an existing processing program is used, it is required for a user to revise only electrode numbers of the existing processing program, and to give a different processing program number to the processing program for which the electrode numbers are revised, to register in the system. Thus, the operability is considerably poor.

Therefore, in a first embodiment, processing programs are automatically analyzed prior to processing, electrode numbers in use are extracted, and the electrode numbers used in each of the processing programs are displayed for each of the processing programs on a screen of an NC controller to present the duplication condition of the electrode numbers to a user, and when duplication is found, the user is urged to revise the electrode numbers, and at the time of execution of the processing programs, revised electrode numbers are read instead of the electrode numbers used in the programs.

Figure 2:
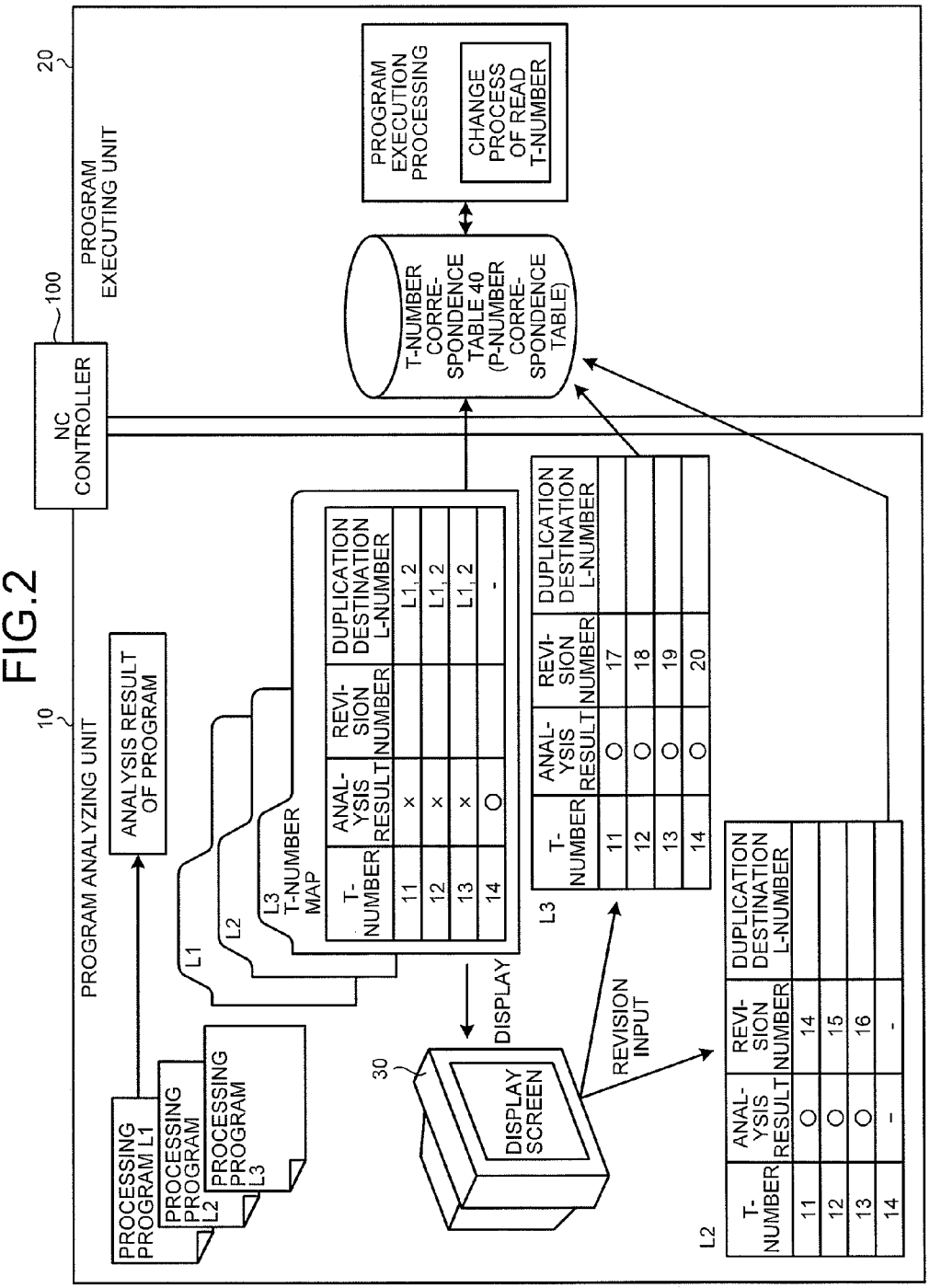
FIG. 2 is a view depicting an example of a system configuration of a control device for a die-sinking electrical discharge machine according to a first embodiment.

FIG. 2 illustrates an example of a conceptual system configuration of a control device for a die-sinking electrical discharge machine according to the first embodiment. In die-sinking electrical discharge machines, electrical discharge is directly generated between an electrode as a tool and a workpiece to perform a removing processing on the workpiece, and a formed electrode is used as the electrode. In the die-sinking electrical discharge machine according to the first embodiment, an automatic tool changer (ATC) is used to change electrodes.

An NC controller 100 that controls the die-sinking electrical discharge machine includes a program analyzing unit 10 and a program executing unit 20. The program analyzing unit 10: extracts electrode numbers (T-numbers) from a plurality of processing programs by analyzing the processing programs that are used successively for processing; analyzes the duplication condition of the extracted electrode numbers; displays a result of the analysis on a display screen 30 of the NC controller 100 as a T-number map of each of the processing programs; and stores in-use electrode numbers of each of the processing programs in a T-number correspondence table 40. Moreover, the program analyzing unit 10, when the T-number map of each of the processing programs displayed on the display screen 30 is revised by a user, updates the T-number correspondence table 40 so that the in-use electrode numbers used in each of the programs and the revised electrode numbers correspond with each other. The program executing unit 20, when processing by the die-sinking electrical discharge machine is to be performed, reads revision electrode numbers instead of the in-use electrode numbers used in each of the processing programs based on correspondence data of the in-use electrode numbers and the revision electrode numbers that is stored in the T-number correspondence table 40 to execute each of the processing programs.

Figure 3:
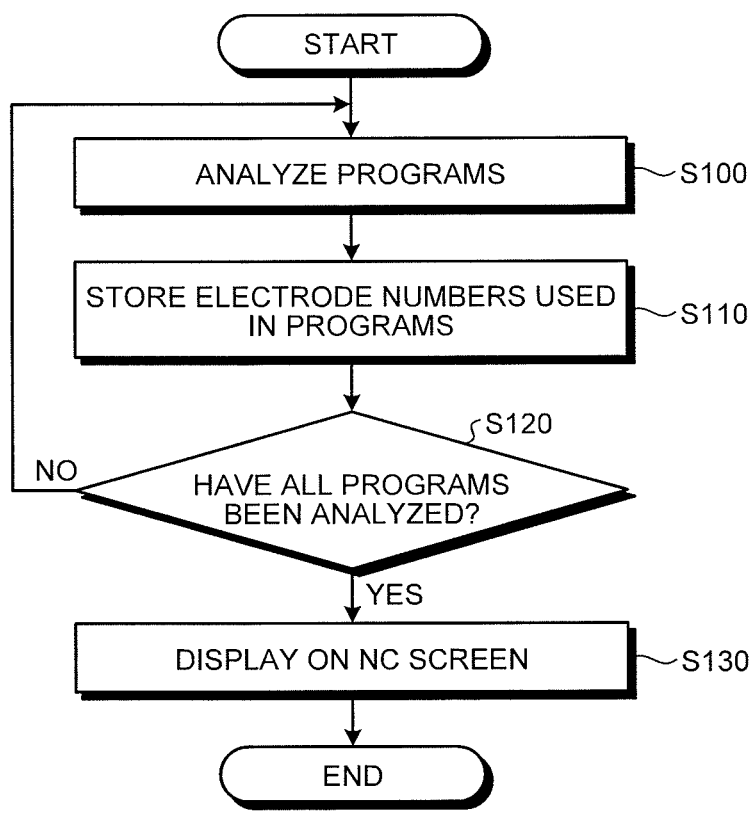
FIG. 3 is a flowchart depicting an example of an analytical procedure of electrode numbers in a program.

Hereinafter, an operation of the first embodiment is explained in reference to a flowchart and the like illustrated in FIG. 3 to FIG. 5. FIG. 3 indicates an example of a process in analysis of electrode numbers performed by the program analyzing unit 10. In this case, it is assumed that processing programs successively executed are three programs L1 to L3. First, the program analyzing unit 10: analyzes the processing programs L1 to L3 to be successively executed (step S100); extracts electrode numbers (T-numbers) that are included in T-commands from the processing programs L1 to L3; analyzes the duplication condition of the extracted electrode numbers; stores a result of the analysis in the T-number correspondence table 40 (steps S110, S120); and displays the result of analysis on the display screen 30 of the NC controller 100 as the T-number map of each of the processing programs L1 to L3 (step S130).

FIG. 4 illustrates an example of a storage content of the T-number correspondence table 40. In the T-number correspondence table 40, correspondence between in-use electrode numbers and revision electrode numbers are stored for each of the processing programs. At this stage, revision electrode numbers have not yet been input, and therefore, the column of revision electrode numbers illustrated in FIG. 4 is blank.

FIG. 5 illustrates the T-number map and a magazine map of each of the processing programs L1 to L3 that are displayed on the display screen. In this case, the T-number maps and the magazine maps are switched to be displayed for each of the processing programs. As illustrated in FIG. 5, the T-number map has a column of analysis results and a column of revision numbers. The magazine map has columns of T-numbers and of duplication destination L-numbers. For a duplicated electrode number, "x" is displayed in the column of analysis results, and for a not duplicated electrode number, "o" is displayed in the column of analysis results. In the column of duplication destinations, a duplicated processing program number is displayed. In the column of magazine maps of each of the processing programs L1 to L3, duplication is displayed for three processing programs L1 to L3.

Figure 6:
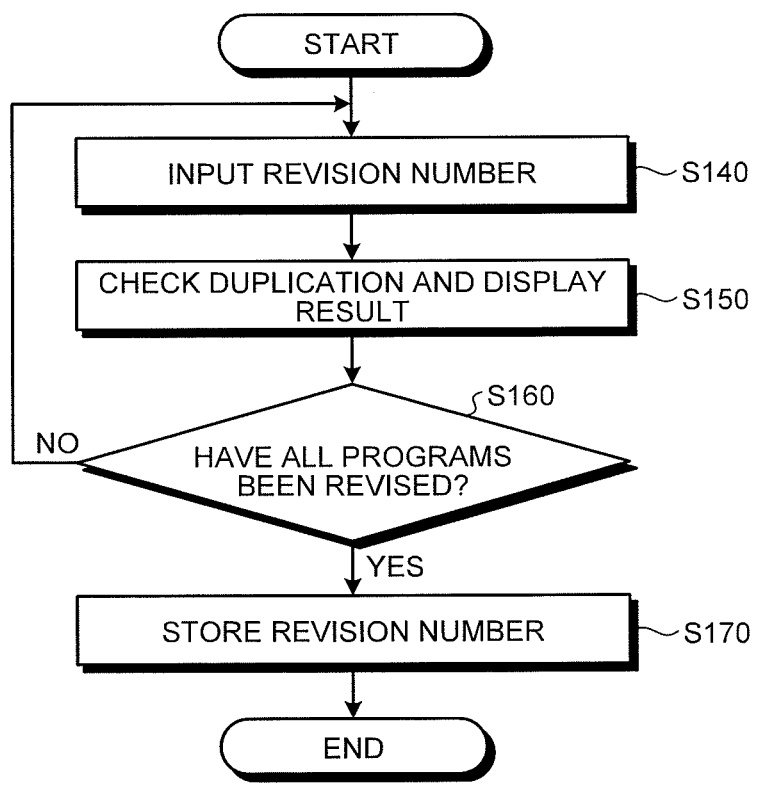
FIG. 6 is a flowchart of a revisional procedure of an electrode number.

FIG. 6 illustrates an example of a revisional procedure of electrode numbers. When the T-number map as illustrated in FIG. 5 is displayed, the program analyzing unit 10 performs highlighting to urge the user to input a revision electrode number when duplication of an electrode number is found. For example, a box of revision number corresponding to an in-use T-number for which "x" is given as the analysis result is highlighted or flashed. When a revision number is input by the user (step S140), the program analyzing unit 10 performs duplication check on the input revision number, and displays a result of the duplication check by "o", "x", and the like at the analysis result (step S150). When input of revision numbers is completed for all of the programs by similar processing (step S160), the program analyzing unit 10 stores contents corresponding to this revised T-number map in the T-number correspondence table 40 (step S170).

Figure 7:
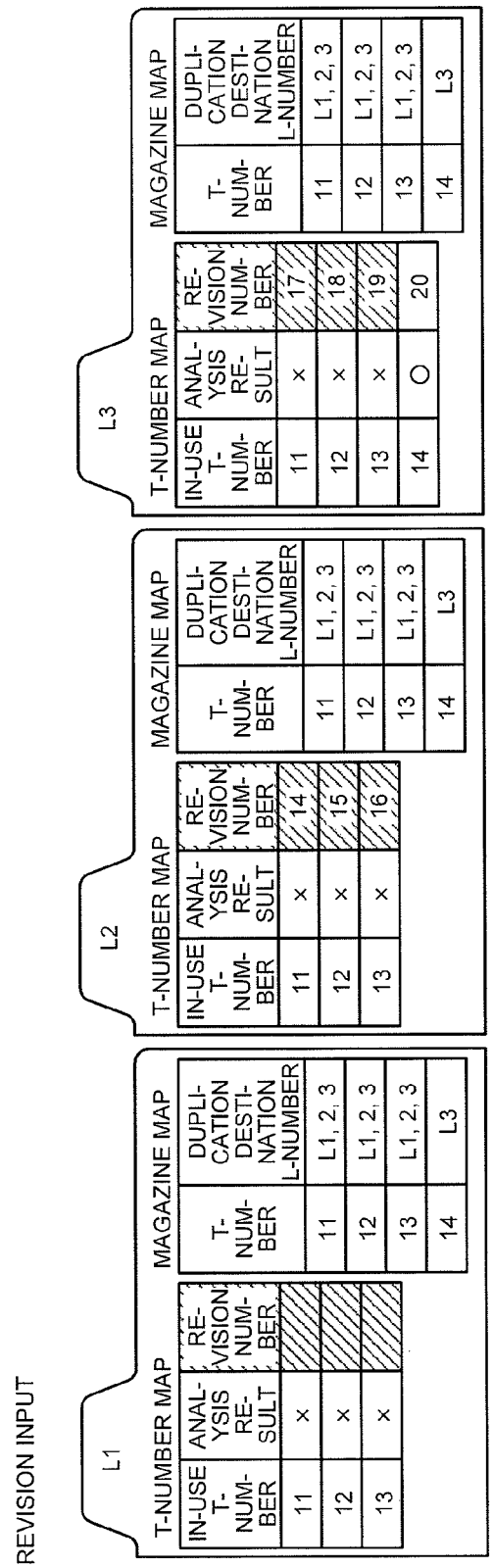
FIG. 7 is a view depicting the T-number map when an electrode number is duplicated.
Figure 8:
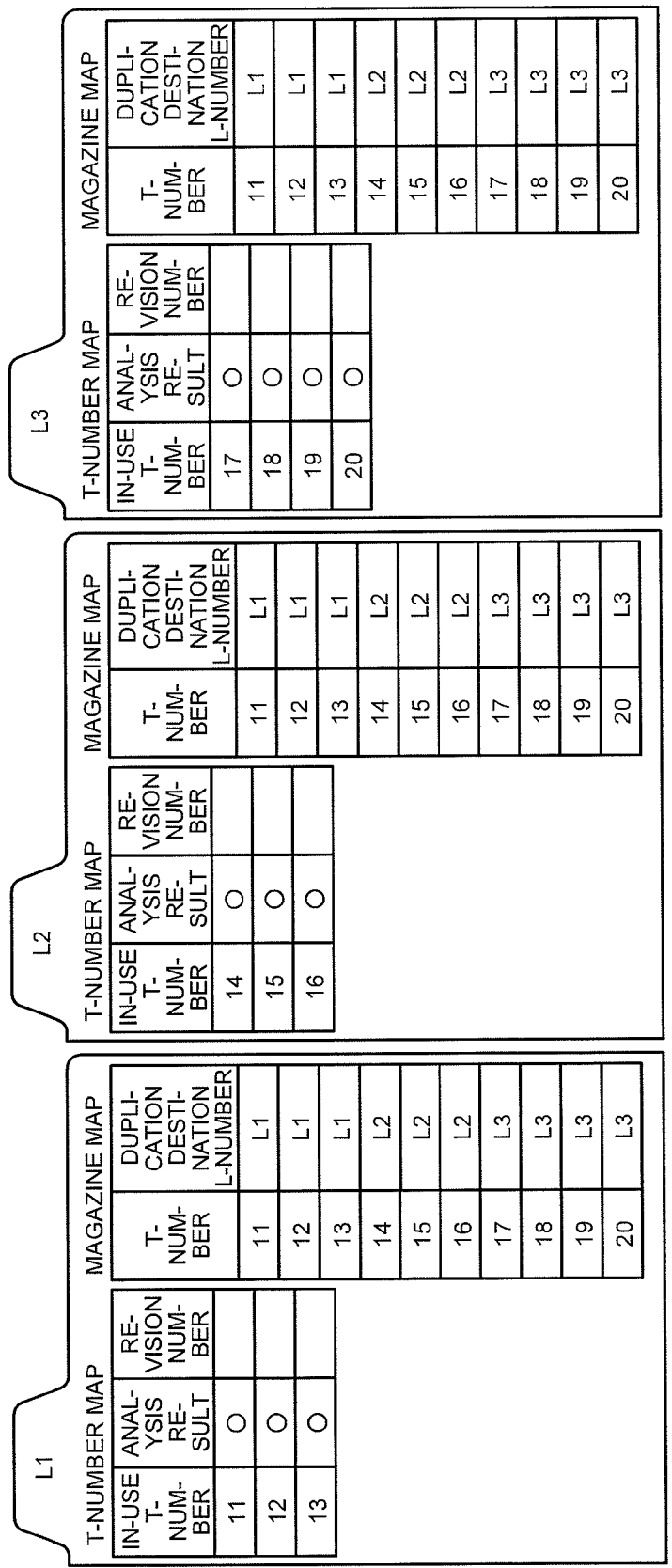
FIG. 8 is a view depicting the T-number map that is displayed again after revision is input.

FIG. 7 illustrates the T-number map and the magazine map when duplication of an electrode number is found. FIG. 7 illustrates a state that boxes of revision numbers corresponding to the analysis result "x" are highlighted (hatched) in the T-number map, and that unique electrode numbers are input in boxes of revision numbers of the processing programs L2 and L3. FIG. 8 illustrates the T-number map and the magazine map that are displayed again after revision is input as illustrated in FIG. 7, and the analysis results are all "o" therein, and there is no duplication in the magazine map. Also on a re-display screen after revision is input as illustrated in FIG. 8, in the column of the magazine map of each of the processing programs L1 to L3, displays for all of the processing programs L1 to L3 are illustrated.

On the other hand, in the T-number correspondence table 40 after revision is input, as illustrated in FIG. 4, the revised electrode numbers are registered in the column of the revision electrode numbers. In this example, although an in-use electrode number "14" of the program number L3 is not duplicated, the number is changed to an electrode number "20".

Figure 9:
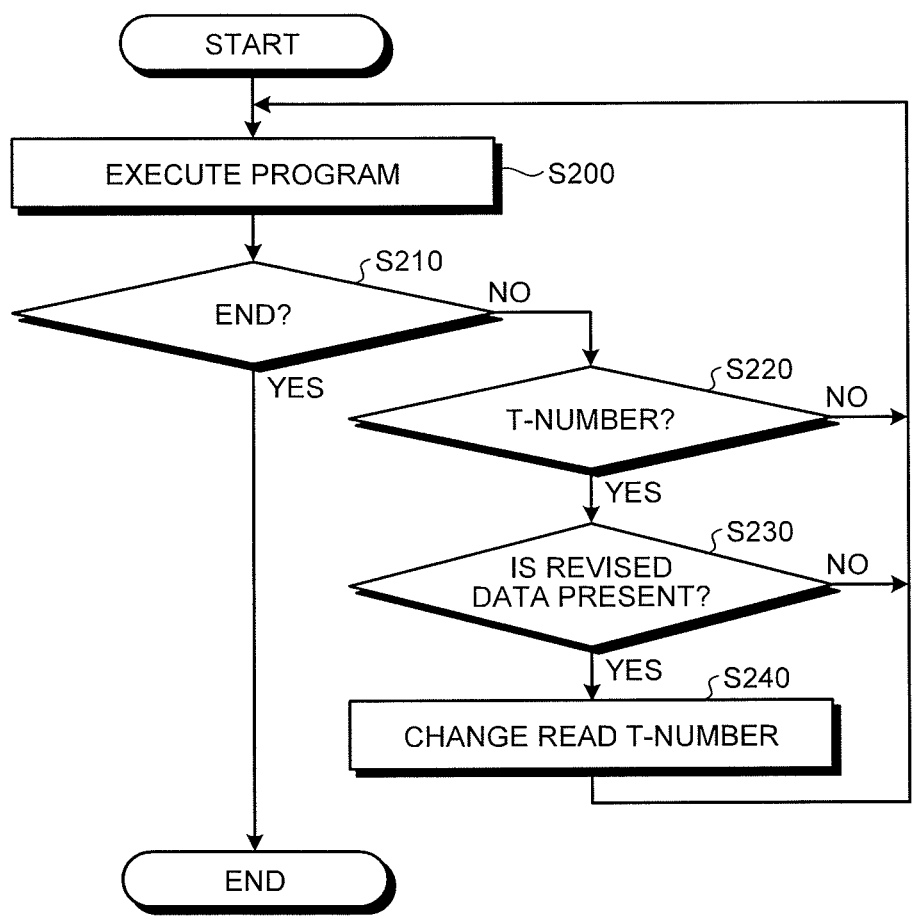
FIG. 9 is a flowchart depicting an example of a program execution procedure at the time of processing.

FIG. 9 indicates a procedure in operation performed by the program executing unit 20 at the time of processing. The program executing unit 20 executes programs successively (steps S200, S210), and when a T-number is detected in a program (step S220), refers to storage data in the T-number correspondence table 40 to determine whether the detected T-number is revised (step S230). When the T-number is not revised, a T-command is executed using this T-number as it is.

On the other hand, when the T-number is revised, the program executing unit 20 reads a revision T-number corresponding to a processing program number of one being executed and the in-use T-number, from the T-number correspondence table 40, and executes the program using the read revision T-number instead of the in-use T-number in the program (steps S240, S200). Note that although a duplicated T-number is changed to a revision T-number to be read, for electrode data (measurement parameters, core shift amounts, etc.) included in a T-command, the electrode data described in the program before revision is used as it is. The program executing unit 20 repeats such a processing. Moreover, the program executing unit 20 does not actually rewrite a T-number in a program, but reads a revision T-number instead of an in-use T-number, to execute the program.

When a content as illustrated in FIG. 4 is stored in the T-number correspondence table 40, if a T-number "12" is detected from the program L2 during execution of the program L2, the program executing unit 20 reads a revision T-number "15" corresponding to the program L2 and the T-number "12". Then, the program is executed using the revision T-number "15" instead of the T-number "12" used in the program L2.

FIG. 10 illustrates another T-number map displayed on the display screen. In FIG. 10, the duplication condition of electrode numbers of multiple programs is illustrated in a single table, and a user can recognize the duplication condition of the electrode numbers of multiple programs simultaneously. FIG. 10(a) depicts an analysis result, and a state that the T-numbers "11", "12", and "13" are duplicated is illustrated. FIG. 10(b) depicts a revision input screen, and depicts a state that a user changes the T-numbers as "11"→"14", "12"→"15", "13"→"16" for the program L2, and "11"→"17", "12"→"18", "13"→"19", "14"→"20" for the program L3. FIG. 10(c) depicts a re-display screen after revision is input, and depicts a state that the duplication has been resolved. Note that sections hatched in FIG. 10 are highlighted sections.

As described, in the first embodiment, programs are analyzed to extract electrode numbers from the programs, the duplication condition of the extracted electrode numbers is determined, a result of the determination is presented to a user, and the programs are executed reading a revised electrode number instead of a duplicated electrode number based on revision made by the user at the time of processing. Therefore, duplication of an electrode number used among the programs can be resolved certainly and easily, and the programs can be successively executed with unique electrode numbers, without changing original programs. Furthermore, the programs are analyzed and the electrode numbers are actually extracted from the programs, and the duplication condition of the extracted electrode numbers is presented to a user for each of the programs. Therefore, the user can recognize the duplication condition of the electrode numbers used in each of the programs, and this makes the revision work easy and mistakes are less likely to be made. Moreover, if the magazine map is referred, electrode attachment to a magazine becomes easy for the user. Furthermore, because an existing program can be used without revising the existing program, the registration work of a program in which only numbers are changed as a new program is not required, and works of the user can significantly be reduced.

Second Embodiment

In a second embodiment, the present invention is applied to a die-sinking electrical discharge machine that has an automatic tool changer (ATC) and an automatic work changer. When a work change command (pallet change command, P-command) is included in a processing program, an automatic work changer is controlled according to the work change command, and workpieces (pallets) are automatically changed.

In the program analyzing unit 10 and the program executing unit 20 of the NC controller 100 that controls the die-sinking electrical discharge machine illustrated in FIG. 2, in addition to analysis of electrode numbers, revision of numbers, and change of electrode numbers read at the execution of the program described above, analysis and revision of P-numbers, and change of P-numbers read at the execution of the program as described below are performed. That is, the program analyzing unit 10 extracts pallet numbers (work numbers, P-numbers) from a plurality of processing programs by analyzing the processing programs used for processing, analyzes the duplication condition of the extracted pallet numbers, displays a result of the analysis on the display screen 30 of the NC controller 100 as a P-number map of each of the processing programs, and stores in-use electrode numbers of each of the processing programs in a P-number correspondence table 40. Moreover, the program analyzing unit 10, when the P-number map of each of the processing programs displayed on the display screen 30 is revised by a user, updates the P-number correspondence table 40 so that the in-use P-numbers used in each of the programs and the revised P-numbers correspond with each other. The program executing unit 20, when processing by the die-sinking electrical discharge machine is to be performed, reads a revision P-number instead of the in-use P-number used in each of the processing programs based on correspondence of the in-use P-numbers and the revision P-numbers that is stored in the P-number correspondence table 40 to execute each of the processing programs.

FIG. 11 illustrates a T-number/P-number map that includes the P-number map in addition to the T-number map described in the first embodiment. The P-number map illustrated on the right indicates that a P-number "1" is used in the programs L1, L2, and L3 and is duplicated. FIG. 12 illustrates the T-number/P-number map after revision by a user, and the P-number map illustrated on the right indicates that the user has revised such that the P-number "1" is used in the program L1, a P-number "2" is used in the program L2, and a P-number "3" is used in the program L3, and thereby the duplication of the P-number has been resolved.

Third Embodiment

While in the first and the second embodiments, a user performs the revision of the T-number/P-number, when the T-number/P-number is duplicated among respective programs, the program analyzing unit 10 may automatically revise the duplicated T-number/P-number to unique T-number/P-number, display the T-number/P-number map that depicts correspondence between the T-number/P-number before revision and the T-number/P-number after revision to let a user check. The user checks the displayed T-number/P-number map, and when it is OK, the user processes data corresponding to the T-number/P-number map to be registered in the T-number/P-number correspondence table 40 as it is, and when it is NG, the user processes, after appropriately revising the T-number/P-number map, revised data to be registered in the T-number/P-number correspondence table 40.

INDUSTRIAL APPLICABILITY

A control device of a die-sinking electrical discharge machine according to the present invention is useful for a die-sinking electrical discharge machine that executes a plurality of processing programs successively to perform die-sinking electrical discharge machining.

REFERENCE SIGNS LIST

10 PROGRAM ANALYZING UNIT
20 PROGRAM EXECUTING UNIT
30 DISPLAY SCREEN
40 T-NUMBER CORRESPONDENCE TABLE (P-NUMBER CORRESPONDENCE TABLE)
100 NC CONTROLLER

The invention claimed is:

1. A control device of a die-sinking electrical discharge machine that performs electrical discharge machining by a die-sinking electrical discharge machine by successively executing a plurality of processing programs that have commands including electrode numbers, comprising:

a program analyzing unit that extracts the electrode numbers included in the processing programs, determines duplication of the electrode numbers among the processing programs to display a result of determination, and that stores correspondence between a revision electrode number that is specified by a user and an in-use electrode number that is used in the processing program for each of the processing programs; and a program executing unit that executes each of the processing programs by reading the revision electrode number instead of the in-use electrode number used in each of the processing programs based on the stored correspondence at the time of execution of the processing programs.

2. A control device of a die-sinking electrical discharge machine that performs electrical discharge machining by a die-sinking electrical discharge machine by successively executing a plurality of processing programs that have commands including pallet numbers, comprising:

a program analyzing unit that extracts the pallet numbers included in the processing programs, determines duplication of the pallet numbers among the processing programs to display a result of determination, and that stores correspondence between a revision pallet number that is specified by a user and an in-use pallet number that is used in the processing program for each of the processing programs; and a program executing unit that executes each of the processing programs by reading the revision pallet number instead of the in-use pallet number used in each of the processing programs based on the stored correspondence at the time of execution of the processing programs.

* * * * *